United States Patent
Aieta et al.

(10) Patent No.: US 6,549,888 B1
(45) Date of Patent: Apr. 15, 2003

(54) SYSTEMS AND METHODS FOR BONDING INFORMATION AND SERVICES TO ASSURE THE ACCURACY OF THE INFORMATION AND/OR PERFORMANCE OF SERVICES PROVIDED BY A NETWORK SERVER

(75) Inventors: Mario A. Aieta, New York, NY (US); Donald T. Beldock, Rye, NY (US); James G. Beldock, Rye, NY (US); Paul V. Greco, New Rochelle, NY (US)

(73) Assignee: AGB², Inc., Purchase, NY (US)

( * ) Notice: Subject to any disclaimer, the term of this patent is extended or adjusted under 35 U.S.C. 154(b) by 266 days.

(21) Appl. No.: 09/639,104

(22) Filed: Aug. 16, 2000

Related U.S. Application Data
(60) Provisional application No. 60/189,034, filed on Mar. 14, 2000.

(51) Int. Cl.[7] .............................................. G06F 17/60
(52) U.S. Cl. ................... 705/4; 705/26; 283/54
(58) Field of Search ..................... 705/26, 4; 283/54

(56) References Cited

U.S. PATENT DOCUMENTS 5,781,632 A * 7/1998 Odom ........................ 380/24
6,157,721 A * 12/2000 Shear et al. ................ 380/255

FOREIGN PATENT DOCUMENTS

WO   WO-01/22341 A1 * 3/2001 ........... G06F/17/60

OTHER PUBLICATIONS

Cashell and Aldhizer, Web Trust: A seal of approval, Jun. 1999, Internal Auditor, vol. 56 No. 3, pp. 50–53.*
Glen and Debreceny, The electronic frontier, May 1998, Journal of Accountancy, vol. 185 No. 5, pp. 32–38.*
Sheehy, Secure transactions: Beyond phase 1, Mar. 1999, CA Magazine, vol. 132 No. 2, pp. 43–45.*
Boritz, Mackler, and McPhie, Reporting on systems reliability, Journal of Accountancy, vol. 188 No. 5, pp. 75–87.*
Ketchum, Taking Title, Jun. 1998, Bests Review, pp. 27–28.*

* cited by examiner

*Primary Examiner*—Joseph Thomas
*Assistant Examiner*—Christopher L. Gilligan
(74) *Attorney, Agent, or Firm*—Harrity & Snyder, L.L.P.

(57) ABSTRACT

A system assures the accuracy of information and the performance of services provided by an entity. The system receives a request from the entity to bond the information and services provided by the entity and evaluates the accuracy of the information and the performance of the services. The system bonds the information when the information is determined to be accurate and the services when performance of the services is assured.

88 Claims, 6 Drawing Sheets

SYSTEMS AND METHODS FOR BONDING INFORMATION AND SERVICES TO ASSURE THE ACCURACY OF THE INFORMATION AND/OR PERFORMANCE OF SERVICES PROVIDED BY A NETWORK SERVER

RELATED APPLICATION

This application claims priority under 35 U.S.C. §119 based on U.S. Provisional Application Serial No. 60/189,034, filed Mar. 14, 2000, the disclosure of which is incorporated herein by reference.

BACKGROUND OF THE INVENTION

A. Field of the Invention

The present invention relates generally to surety systems and, more particularly, to systems and methods that bond information and services provided in a transaction.

B. Description of Related Art

Electronic commerce ("eCommerce") has dramatically increased in recent years. In some conventional eCommerce systems, transactions occur over a network, such as the Internet, using protocols or mechanisms, such as the Hypertext Transfer Protocol (http://). A user may access a web site, or the like, of a server to seek out or research information, purchase, or research goods and/or services, and communicate with other users, web sites, or services.

In other conventional eCommerce systems, a growing number of transactions are performed across intranets and internets, such as the Internet, by protocols or mechanisms other than the Hypertext Transfer Protocol (http://). Such non-http-based transactions use a myriad of different protocols and languages to encode the information, including Electronic Data Interchange (EDI), File Transfer Protocol (FTP), Extensible Markup Language (XML) send and receive, Standard Generalized Markup Language (SGML), etc. Furthermore, transactions such as these use transport mechanisms with protocols other than, or built upon, Transmission Control Protocol/Internet Protocol (TCP/IP), such as Internetwork Packet Exchange (IPX), Internet Protocol Security (IPSEC), Internet Protocol Version 6 (Ipv6), Secure Sockets Layer(SSL), etc. Also, these non-Web-based transactions can occur as a result of interconnections between systems through a common language specified by a metalanguage (e.g., specified by XML) or through direct binary communication between systems (e.g., via Distributed Component Object Model (DCOM), Common Object Request Broker Architecture (CORBA), or other distributed object, procedural, or client-server architectures).

Uncertainties exist, however, in almost any conventional eCommerce transaction, such as the uncertainty of whether certain services and information will be provided as promised. With the vast amount of services and information available on the Internet, for example, users have no way to determine whether services will be performed as promised or whether provided information is accurate and valid.

As a result, a need exists for a mechanism to guarantee the performance of services and the accuracy and validity of information presented as part of an eCommerce transaction.

SUMMARY OF THE INVENTION

Systems and methods consistent with the present invention address this need by providing to participating servers a mechanism for supplying a guarantee to their customers, under a surety bond issued by a bona fide, financially competent bonding institution (or "bonding agent"), that certain services will be provided and that information provided by the server is accurate and valid.

In accordance with the purpose of the invention as embodied and broadly described herein, a system assures the accuracy of information and the performance of services. The system receives a request from an entity to bond the information and services corresponding to the entity and evaluates the accuracy of the information and the performance of the services. The system bonds the information when the information is determined to be accurate and the services when performance of the services is assured.

In another implementation consistent with the present invention, a method assures the accuracy of information and the performance of services provided by an entity. The method includes receiving a request from the entity to bond the information and the services provided by the entity; receiving a warranty from the entity, the warranty indicating to the bonding agent that the information is accurate or that the service performance is guaranteed; and bonding the information based on the warranty when the warranty indicates that the information is accurate and the services based on the warranty when the warranty indicates that the service performance is guaranteed.

In yet another implementation consistent with the present invention, a system guarantees the accuracy of a group of data and the performance of a series of services provided by an entity over a period of time. The system receives a request from the entity to bond the group of data and the series of services provided by the entity over the time period and analyzes the accuracy of the group of data and the performance of the series of services. The system bonds the group of data when the data is determined to be accurate and the series of services when performance of the series of services is assured.

In a further implementation consistent with the present invention, a method guarantees the accuracy or validity of information provided by an entity. The method includes analyzing a request from the entity to bond information provided by the entity; determining whether the information is accurate or valid; and assigning a bond to the information when the information is determined to be accurate or valid. The bond identifies an amount of indemnity to be paid when the information is later found to be inaccurate or invalid.

In another implementation consistent with the present invention, a method guarantees the performance of a service offered by an entity. The method includes analyzing a request from the entity to bond performance of the service offered by the entity; determining whether performance of the service is assured; and assigning a bond to the performance of the service when the performance of the service is determined to be assured. The bond identifies an amount of indemnity to be paid when the service is performed in a manner other than as offered.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention guarantee the accuracy and validity of information and guarantee that services will be performed as promised by providing an indemnity when the information turns out to be inaccurate or invalid or the services go unperformed or are performed in a manner other than as promised.

Exemplary System

An exemplary system consistent with the present invention includes various logical groupings of entities provided by one or more devices. An "entity" refers to a device, resource, data, or functionality that can be accessed by a user, program, device, or another entity, that can be computational, storage-related, communication-related, or related to providing access to another user. Examples of entities include software, such as application programs, threads, and processes; information, such as databases and files; objects as traditionally defined in the art, including, but not limited to, Component Object Model (COM), COM+, or Common object Request Broker Architecture (CORBA)-compliant objects, or other objects that do not necessarily comply with an over-arching object model; and hardware, such as computer devices and components.

In an interaction between two entities within the exemplary system, the "client" entity requests information or services (directly or indirectly) from the "server" entity. The client and server entities may physically reside on a single computer or on multiple computers. In some instances, an entity may be both a client and a server entity. For example, in a business-to-business transaction, a first entity may request goods, services, and/or information from a second entity at one point, and provide goods, services, and/or information to the second entity at another point. In this case, the first and second entities may be considered both client and server entities.

Figure 1:
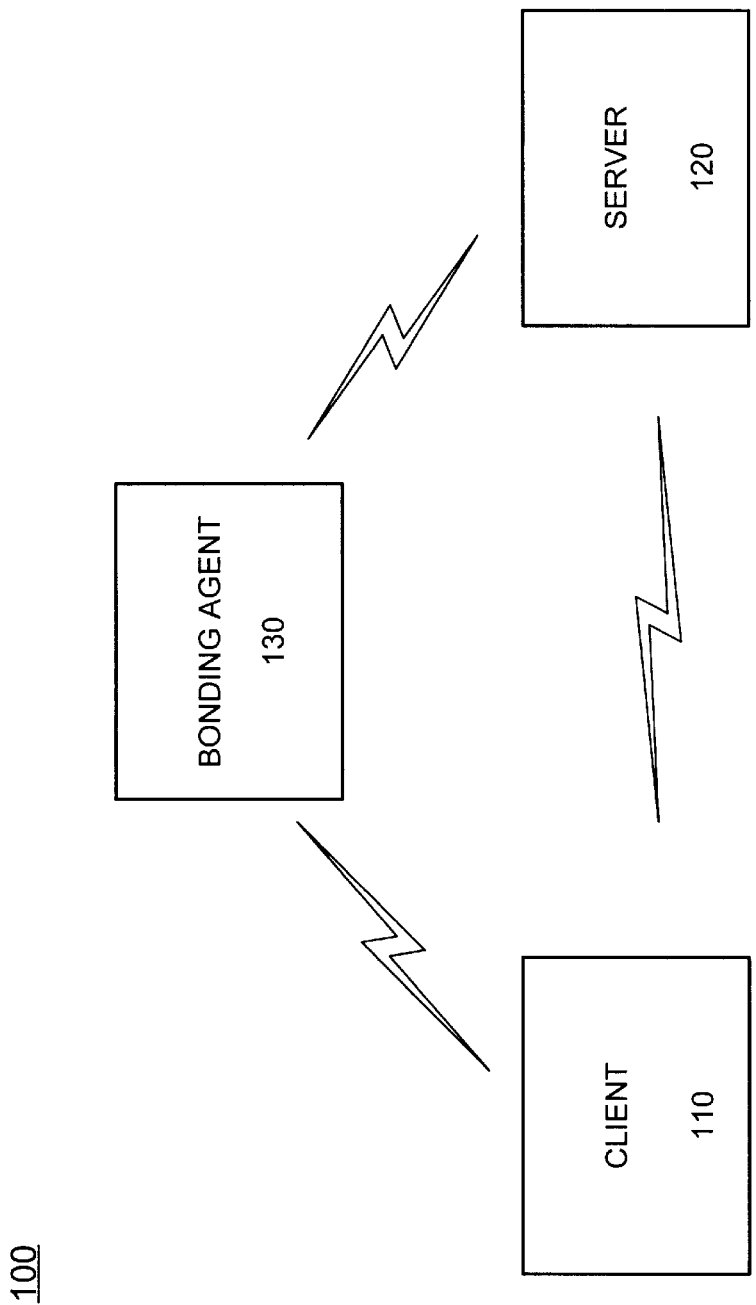
FIG. 1 is a diagram of an exemplary system consistent with the present invention.

FIG. 1 is a block diagram of the exemplary system 100 consistent with the present invention. The system 100 includes a client 110 communicating with a server 120 and a bonding agent 130. The client 110, server 120, and bonding agent 130 may be implemented as one or more devices and may communicate via any communications medium (e.g., by wired, wireless, or optical communication; via a network, such as the Internet; via a storage device; etc.).

The client 110 is an entity that can communicate with the server 120, such as a personal computer, a laptop, a personal digital assistant (PDA), a wireless telephone, some equivalent device, a thread or process running on one of these devices, or an object executable by one of these devices. The server 120 may include any conventional server entity. The server 120 provides goods, services, and/or information via an interface (e.g., a web site or the like) for use by users associated with entities, such as client 110. A single client 110 and server 120 have been shown for simplicity. One skilled in the art would recognize that the system 100 may include any number of clients 110 and servers 120.

The bonding agent 130 is an entity, possibly associated with a bonding institution. The bonding agent 130 issues a surety bond to a user that provides a substantial indemnity to be paid to any user who receives inaccurate or invalid information or a breach of a duty to perform a service from a bonded server. The indemnity may be paid by the server that provides, or fails to provide, the information or service to the user.

The amount of the indemnity may be pre-set for different categories of information or services. For example, the amount of the indemnity may vary for inaccurate financial information as compared to inaccurate entertainment information. The amount of indemnity may be set forth in support and explanatory material provided on the participating server in such a manner as to permit the server to promote the fact that the indemnity is of meaningful financial value. In such explanatory materials on the participating server, and as an element of the contract contained therein, the manner of establishing a claim by a user may be clearly set forth.

In this implementation, the information provided by a server 120 is guaranteed to be accurate and valid and the services provided by the server 120 are guaranteed to be performed as promised through a surety bond provided by the bonding agent 130. In such an implementation, any information or service provided by the server 120 may be covered by a surety bond provided by the bonding agent 130.

The bonding agent 130 ultimately defines the "bondable domain" (i.e., the types of information or services for which it will and will not issue a bond), though the assessment of whether information or services fall within the bondable domain may be performed by other entities. In one implementation consistent with the present invention, the bonding agent 130 announces what the bondable domain includes and a server 120 may only ask questions regarding information or services within the bondable domain, if it wishes to protect the information or services. In another implementation, the server 120 predetermines what its bondable domain will be. The bondable domain of the server 120 will be the same as or a subset of the bondable domain of the bonding agent 130. In yet another implementation, the server 120 determines whether information or services fall within the bondable domain on a transaction-by-transaction, client-by-client, on-the-fly basis, etc.

Figure 2:
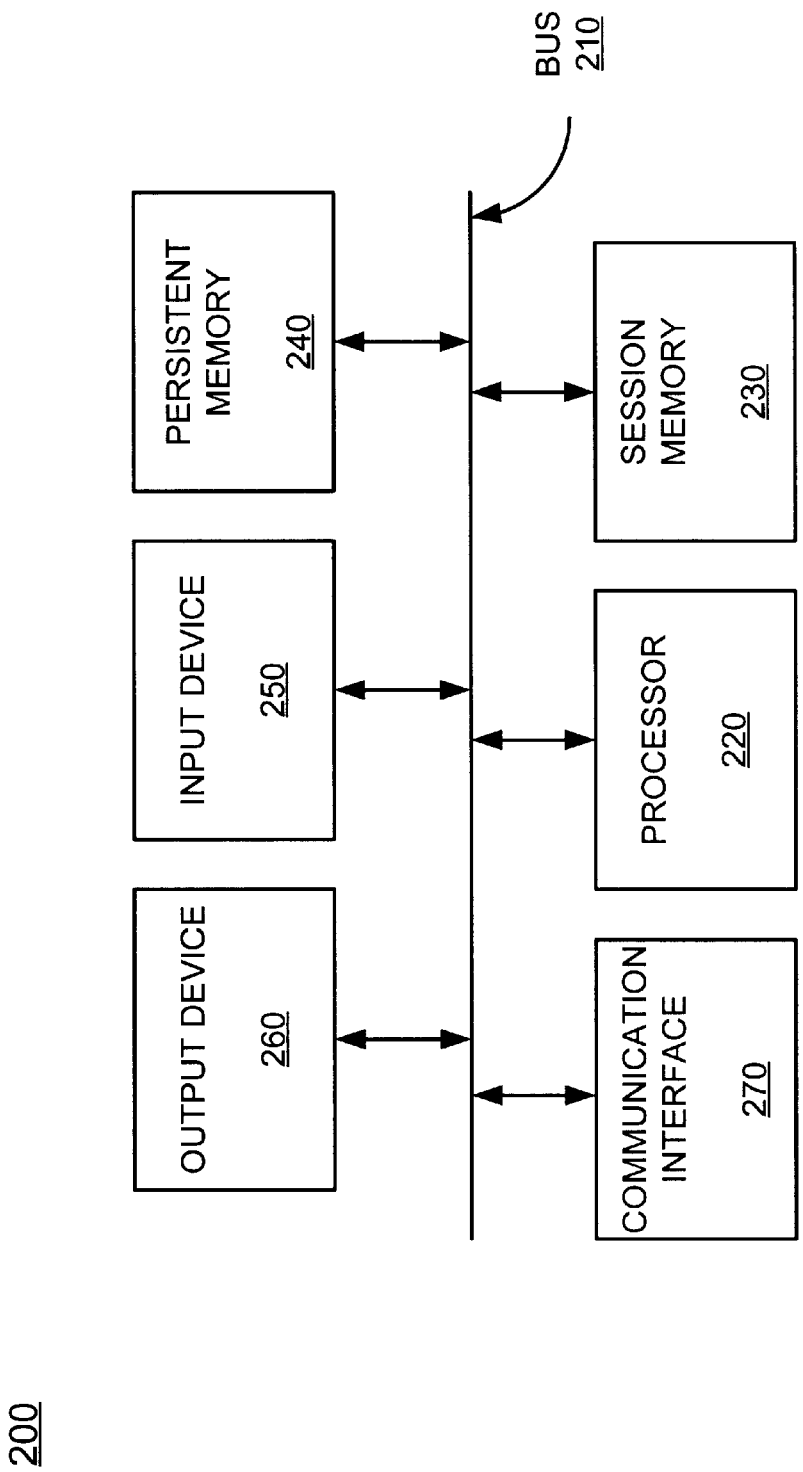
FIG. 2 is a detailed diagram of an exemplary device that may incorporate the client, server, and/or bonding agent entities of FIG. 1.

FIG. 2 is an exemplary diagram of a device 200 that may incorporate client 110, server 120, and/or bonding agent 130 in one implementation consistent with the present invention. One skilled in the art would recognize that other configurations are possible.

The device 200 includes a bus 210, a processor 220, a session memory 230, a persistent memory 240, an input device 250, an output device 260, and a communication interface 270. The bus 210 permits communication among the components of the device 200. The processor 220 may include any type of conventional processor or microprocessor that interprets and executes instructions. The session memory 230 may include a random access memory (RAM) or another dynamic storage device that stores information and instructions to be executed by the processor 220, and/or a read only memory (ROM) or another type of static storage device that stores static information and instructions for use by the processor 220. The persistent memory 240 may include a hard disk, a floppy disk, a CD-ROM, a DVD-RAM, and/or some other type of magnetic or optical recording medium and its corresponding drive.

The input device 250 may include any conventional mechanism capable of inputting information into the device 200, such as a keyboard, a mouse, a pen, voice recognition and/or biometric mechanisms, etc. The output device 260 may include any conventional mechanism capable of outputting information from the device 200, including a display, a printer, a pair of speakers, etc. The communication interface 270 may include any transceiver-like mechanism that permits the device 200 to communicate with other devices and/or systems.

As will be described in detail below, a device 200, consistent with the present invention, may assure the accuracy and validity of information and the performance of services provided by a server. The device 200 performs this task in response to processor 220 executing sequences of instructions contained in a computer-readable medium, such as session memory 230. A computer-readable medium may include one or more memory devices and/or carrier waves. The instructions may be read into memory 230 from another computer-readable medium, such as the persistent memory 240, or from another device via the communication interface 270.

Execution of the sequences of instructions contained in memory 230 causes processor 220 to perform processes that will be described later. Alternatively, hardwired circuitry may be used in place of or in combination with software instructions to implement processes consistent with the present invention. Thus, the present invention is not limited to any specific combination of hardware circuitry and software.

System Processing

In essence, the system 100 attaches a bond to information or services provided by a server guaranteeing the accuracy and validity of the information and the performance of the services. The system 100 may do this in many different ways. With regard to information, for example, the system 100 may directly evaluate the accuracy and validity of information provided by the server either beforehand or during a transaction, using, for example, artificial intelligence (AI), online analytical processing (OLAP), or a statistical or heuristic assessment. In this case, the system 100 may previously establish what constitutes accurate and valid information. Alternatively, the system 100 may be presented with information that is warranted to be accurate and valid and bond the information based on the warranty.

With regard to services, the system 100 may evaluate evidence provided by the server that it has systems and/or methods in place to perform services as promised. For example, the server may provide evidence regarding the performance of services, such as the delivery of services (i.e., that it will be able to perform the promised services), the timeliness of the delivery of services (i.e., that it will be able to perform the services within or by a promised time), and/or the correct implementation and delivery of the services (i.e., that it will be able to perform the promised services in a correct and proper manner). In this case, the system 100 may bond the services based on the evidence. Alternatively, the server may warrant that it will perform services as promised. In this case, the system 100 may bond the services based on the warranty.

Figure 3:
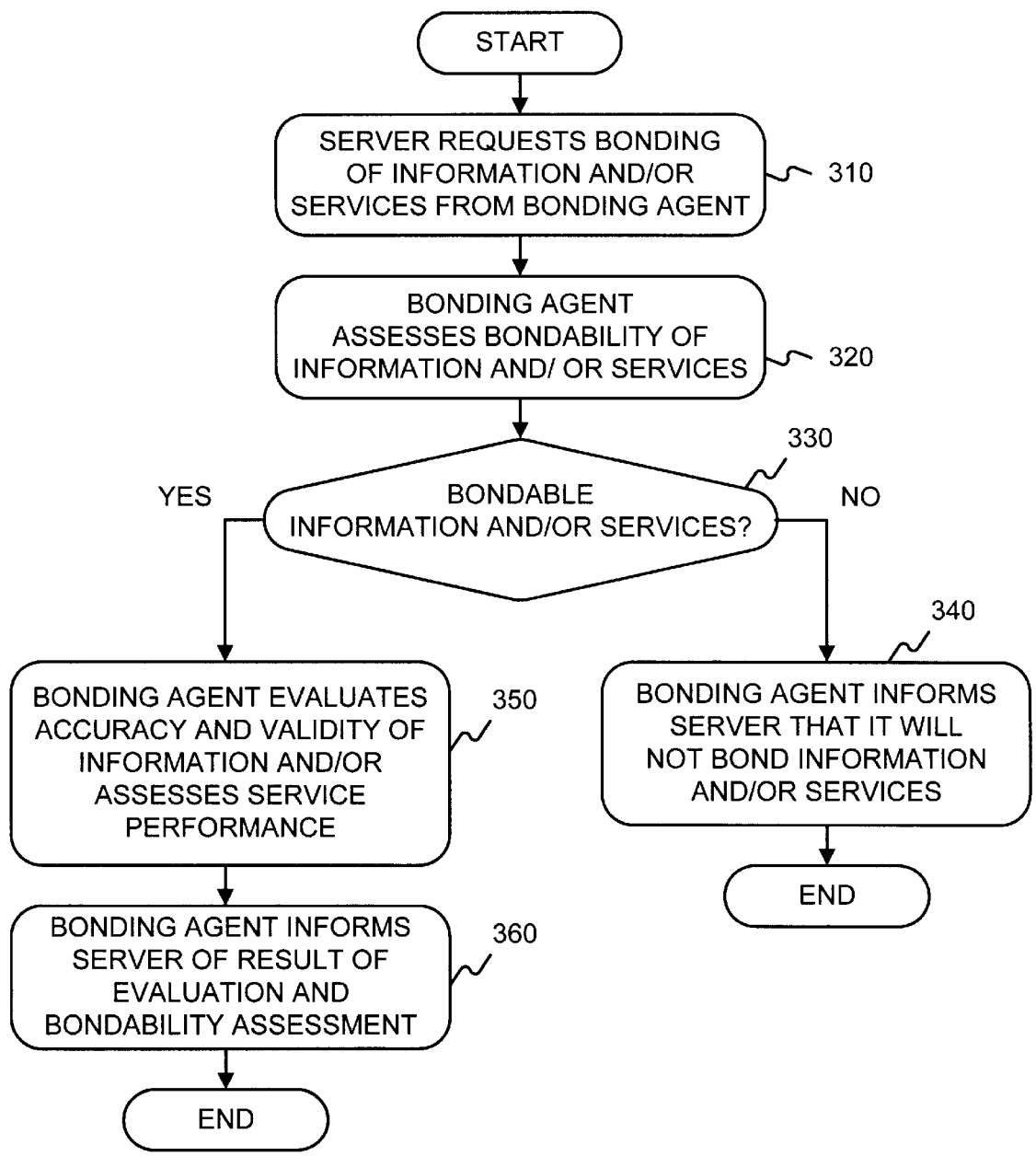
FIG. 3 is a flowchart of processing evaluating the accuracy and validity of information and/or services provided by a server.

FIG. 3 is a flowchart of processing by which the system 100 evaluates the accuracy and validity of information and/or services provided by a server 120. Suppose, for example, that a client 110 accesses the server 120 in a conventional manner to request information regarding a credit history report. Suppose further that the server 120 informs the client 110 that it will provide the credit report within twenty-four hours.

Processing may begin before the client 100 sends a request to the server 120 (e.g., at the time when the server 120 determines the types of information and/or services that it will provide). Alternatively, processing may begin at the time of the client request. In either case, the server 120 contacts the bonding agent 130, using conventional techniques, to request bonding of particular pieces or types of information or services [step 310]. During the course, of a transaction, the client 110 may also contact the bonding agent 130 to make certain that a bonded event is, indeed, occurring.

In the example, the server 120 may arrange beforehand with the bonding agent 130 to bond the credit histories that it maintains in its databases. The server 120 may demonstrate to the bonding agent 130 that it obtained its data from very reliable sources and may possibly show its systems for updating the data. The server 120 may also arrange to bond its twenty-four hour delivery service. The server 120 may demonstrate to the bonding agent 130 that it has systems in place that guarantee that it will be able to deliver a credit report within twenty-four hours. Based on the data provided by the server 120, the bonding agent 130 may determine whether to bond the credit histories and/or the delivery service.

Upon receipt of data from the server 120 regarding the bonding of information and/or services provided by the server 120, the bonding agent 130 may assess the bondability of the information and/or services [step 320]. In other words, the bonding agent 130 determines whether the information and/or services fall within the bondable domain of the bonding agent 130 (i.e., whether this is the kind of information and/or services that it wants to bond).

If the bonding agent 130 determines that the information and/or services fall outside the bondable domain [step 330], the bonding agent 130 informs the server 120 that it will not bond the information and/or services [step 340]. If, however, the bonding agent 130 determines that the information and/or services fall within the bondable domain [step 330], the bonding agent 130 may evaluate the accuracy and validity of the information, if possible, and/or assess the systems that the server 120 has in place to provide the services [step 350].

To determine whether information is accurate and valid, the bonding agent 130 may use predefined heuristics, AI, or OLAP. To determine whether performance of a service may be met, the bonding agent 130 may analyze data, such as past performance or test runs, provided by the server 120. The bonding agent 130 then informs the server 120 of the result of the evaluation and/or the bondability assessment [step 360]. If the bonding agent 130 determines that the information is inaccurate or invalid, the bonding agent 130 may provide information that it determines to be accurate and valid, if possible, to the server 120. If, instead, the bonding agent 130 determines that the information is accurate and valid and/or the server 120 will be able to meet the promised service performance, the bonding agent 130 may inform the server 120 that it will bond the information and/or service.

Figure 4:
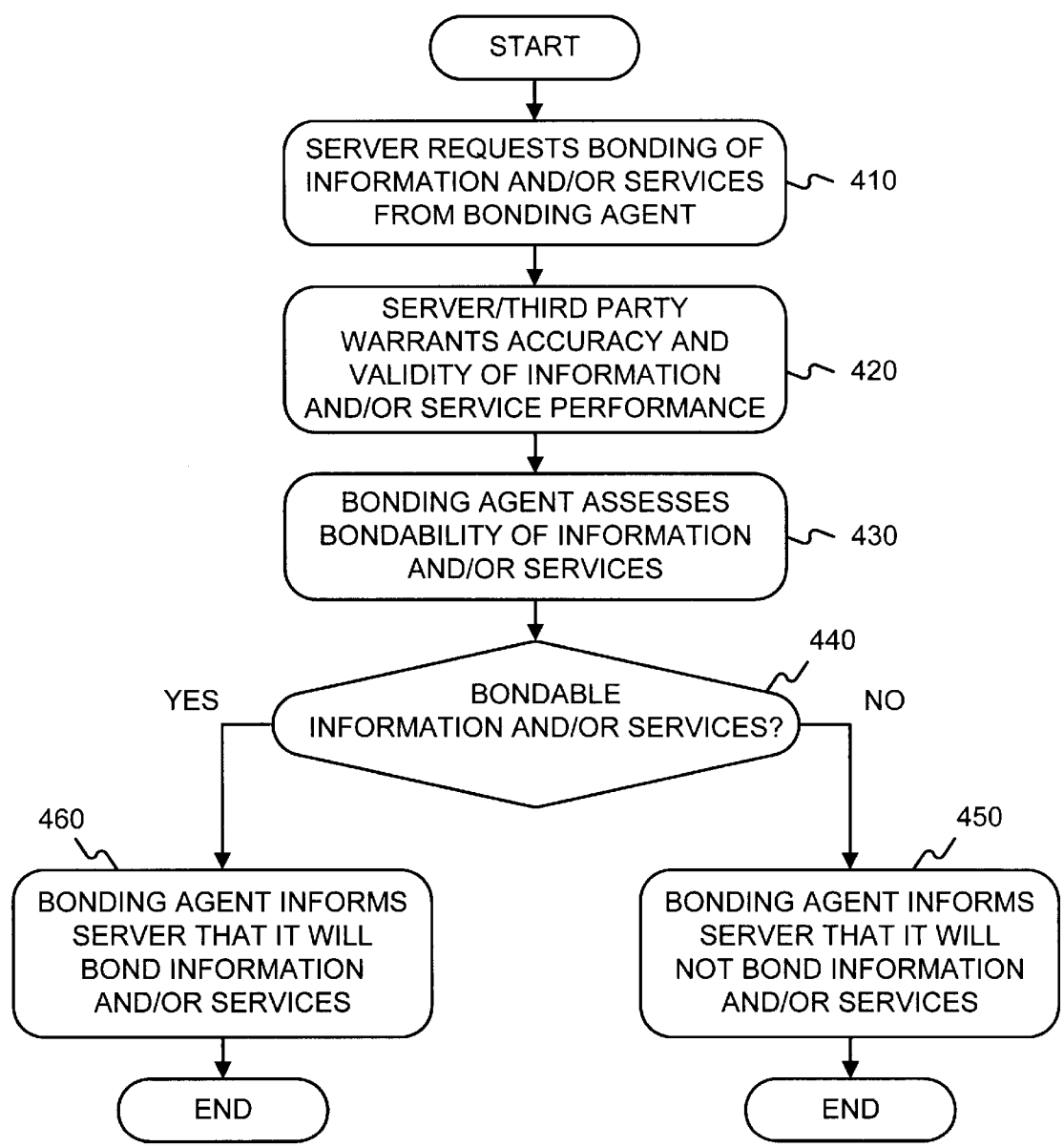
FIG. 4 is a flowchart of processing for bonding information that is warranted to be accurate and valid and/or services that are warranted to be performed as promised.

FIG. 4 is a flowchart of processing by which the system 100 bonds information that is warranted to be accurate and valid and/or services that are warranted to be performed as promised. Suppose again that a client 110 requests information regarding a credit history report and that the server 120 informs the client 110 that it will provide the credit report within twenty-four hours.

Processing may begin before the client 100 sends a request to the server 120 (e.g., at the time when the server 120 determines the types of information and/or services that it will provide). Alternatively, processing may begin at the time of the client request. In either case, the server 120 contacts the bonding agent 130, using conventional techniques, to request bonding of particular pieces or types of information or services [step 410]. In this case, the server 120 warrants that the information it provides is accurate and valid and that the services it provides will be performed as promised [step 420]. The server 120 may do this by providing its own warranty or a warranty of a third (trusted) party.

The bonding agent 130 then assesses the bondability of the information and/or services [step 430]. In other words, the bonding agent 130 determines whether the information and/or services fall within the bondable domain of the bonding agent 130 (i.e., whether this is the kind of information and/or services that it wants to bond). If the bonding agent 130 determines that the information and/or services fall outside the bondable domain [step 440], the bonding agent 130 informs the server 120 that it will not bond the information and/or services [step 450]. If, however, the bonding agent 130 determines that the information and/or services fall within the bondable domain [step 440], the bonding agent 130 may inform the server 120 that it will bond the information and/or services based on the received warranty or warranties [step 460].

Figure 5A:
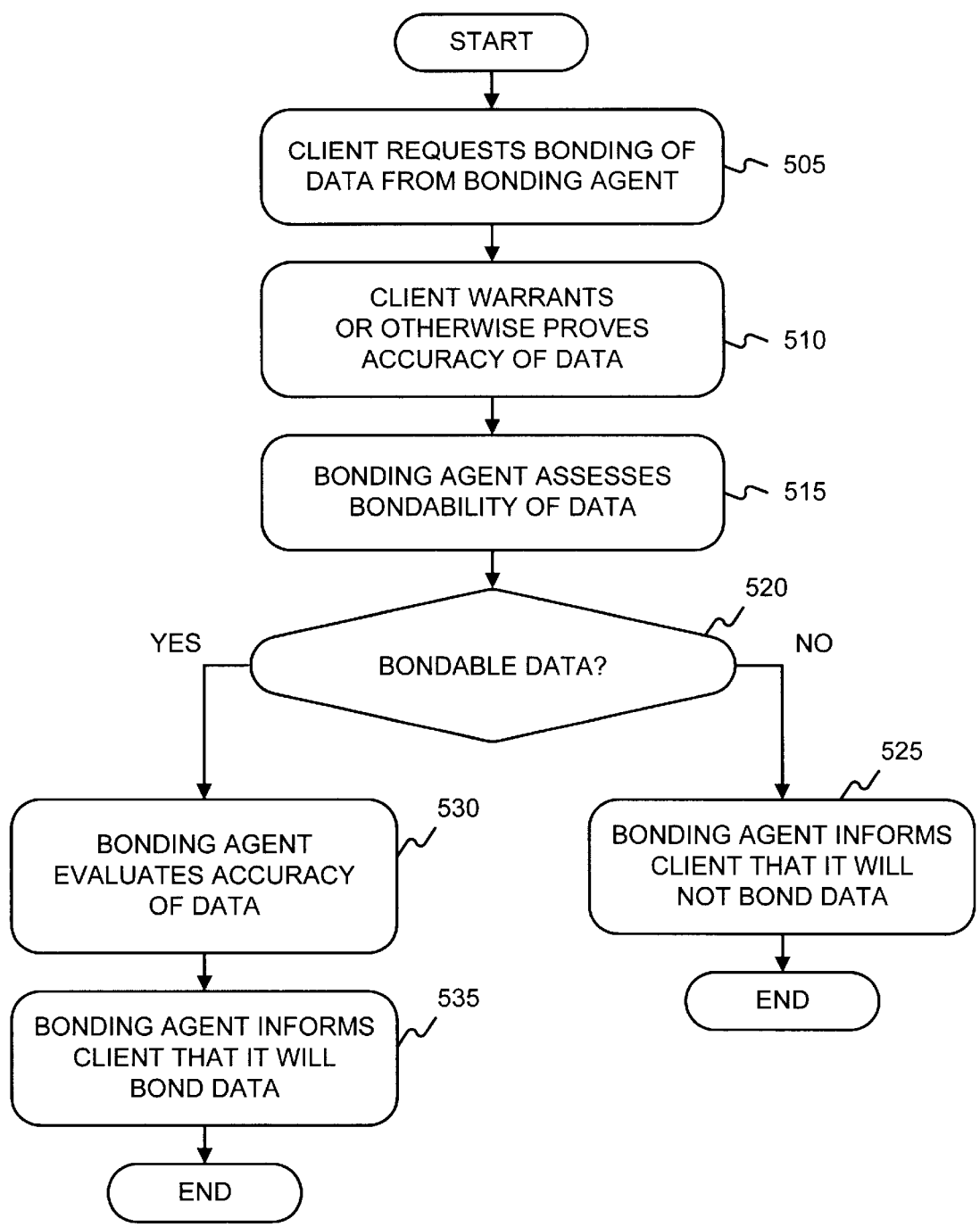
FIGS. 5A and 5B are flowcharts of processing for bonding information and/or services over a series of transactions.
Figure 5B:
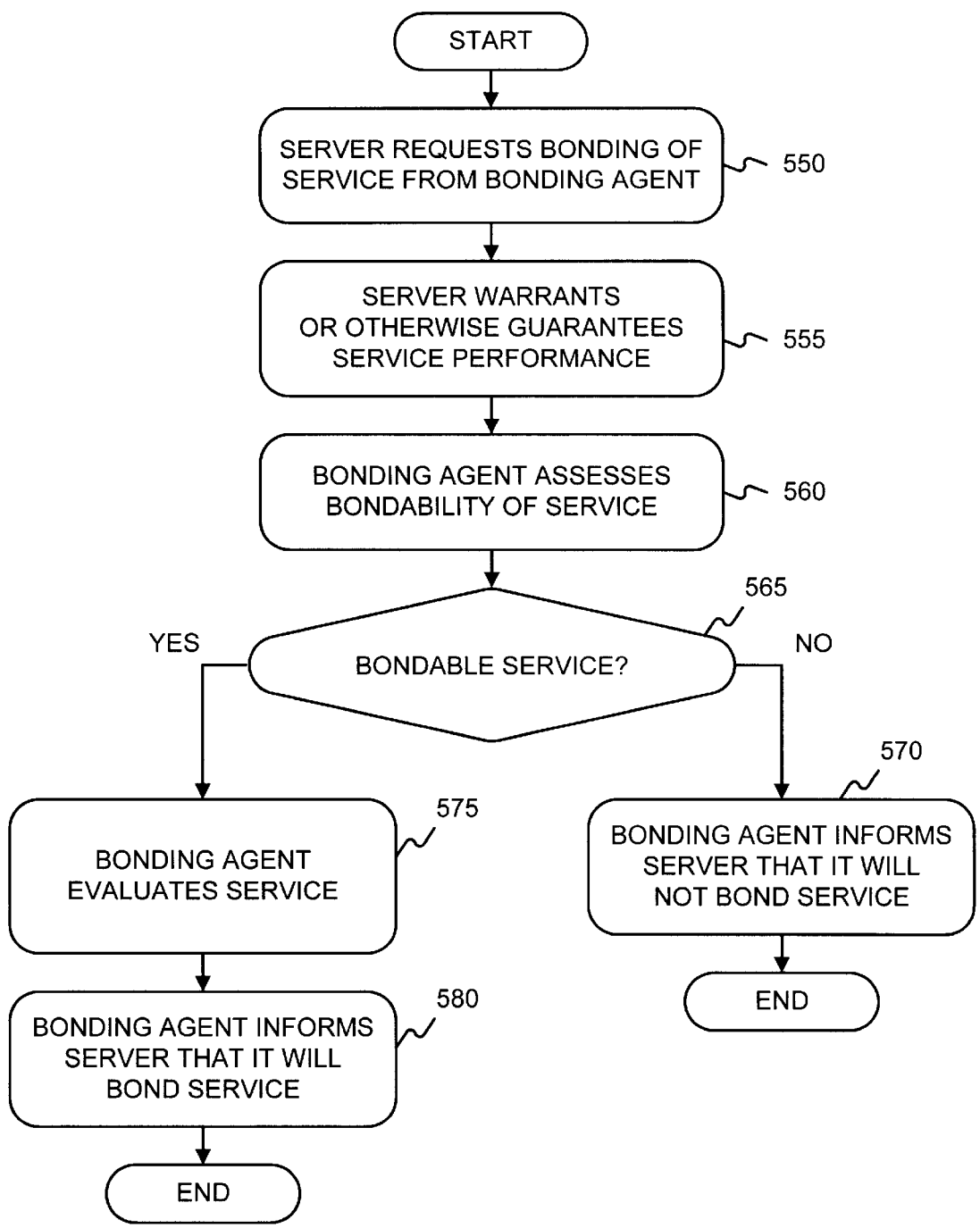

FIGS. 5A and 5B are flowcharts of processing by which the system 100 bonds information and/or services over a series of transactions. Suppose, for example, that a client 110 desires to purchase supplies from a server 120 over a period of time and that the server 120 promises to deliver each purchase order to the client 110 for approval within two hours of receipt of a request. Suppose further that the client 110 wants to bond the accuracy of the data contained in each of its supply requests and the server 120 wants to bond the timeliness of its purchase order deliveries.

With regard to the purchase requests, processing might begin with the client 110 contacting the bonding agent 130, using conventional techniques, to request bonding of the data included in a group of purchase requests that it will make during the time period [step 505] (FIG. 5A). The client 110 may warrant the accuracy of the data that it will provide in its future supply requests or may demonstrate that it has systems in place to guarantee the accuracy of the data [step 510].

The bonding agent may then assess the bondability of the data by determining whether the data falls within the bondable domain of the bonding agent 130 (i.e., whether this is the kind of information that it wants to bond) [step 515]. If the bonding agent 130 determines that the data falls outside the bondable domain [step 520], the bonding agent 130 informs the client 110 that it will not bond the data in its supply requests [step 525].

If, however, the bonding agent 130 determines that the data falls within the bondable domain [step 520], the bonding agent 130 may evaluate the accuracy of the data, if possible [step 530]. In this example, the bonding agent 130 may evaluate the data by simply accepting the warranty given by the client 110 or by assessing the systems that the client 110 has in place to guarantee the accuracy of the data. The bonding agent 130 then informs the client 110 of the result of the evaluation and/or the bondability assessment [step 535].

With regard to the purchase order delivery, processing might begin with the server 120 contacting the bonding agent 130, using conventional techniques, to request bonding of the delivery of each of the purchase orders within two hours of receipt of a purchase request [step 550] (FIG. 5B). The server 120 may warrant the timeliness of its purchase order deliveries or may demonstrate that it has systems in place to guarantee the delivery of the purchase orders within two hours of receipt of a request [step 555].

The bonding agent may then assess the bondability of the delivery service by determining whether the service falls within the bondable domain of the bonding agent 130 (i.e., whether this is the kind of service that it wants to bond) [step 560]. If the bonding agent 130 determines that the service falls outside the bondable domain [step 565], the bonding agent 130 informs the server 120 that it will not bond its purchase order delivery service [step 570].

If, however, the bonding agent 130 determines that the service falls within the bondable domain [step 565], the bonding agent 130 may evaluate the service [step 575]. In this example, the bonding agent 130 may evaluate the service by simply accepting the warranty given by the server 120 or by assessing the systems that the server 120 has in place to guarantee the timeliness of its purchase order deliveries. The bonding agent 130 then informs the server 120 of the result of the evaluation and/or the bondability assessment [step 580].

Conclusion

Systems and methods consistent with the present invention guarantee under surety bond that information is accurate and valid and that services will be performed as promised and provide an indemnity when the information turns out to be inaccurate or invalid or the services go unperformed or are performed in a manner other than as promised.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although a series of steps have been provided with regard to the flowcharts of FIGS. 3–5B, the order of the steps may vary in other implementations consistent with the present invention.

In addition, the preceding description identified the bonding agent 130 as the entity that determines the bondability of information and services. This need not be the case, however. In one implementation consistent with the present invention, the bonding agent 130 advertises the categories of information and services that it will bond and the server 120, or possibly the client 110, determines whether information or services it wants bonded falls within these categories.

Also, the preceding description identified the server 120 as the entity that requests the bonding services of the bonding agent 130. In other implementations consistent with the present invention, the client 110 may request bonding services relating to information and/or services provided by the server 120.

Furthermore, the preceding description identified a bond as the vehicle by which information and/or services are guaranteed. In other implementations consistent with the present invention, other forms of guarantees may be used.

The scope of the invention is defined by the claims and their equivalents.

What is claimed is:

1. An automated method for assigning a bond to at least one of information and services provided by a server in a transaction with a client, the bond assuring at least one of accuracy of the information and performance of the services provided by the server, the method comprising:
   receiving a request from the server via a network to assign a bond to at least one of the information and the services provided by the server;
   evaluating at least one of the accuracy of the information and the performance of the services; and
   assigning a bond to at least one of the information when the information is determined to be accurate and the services when performance of the services is assured, the bond assuring an indemnity will be provided to the client when at least one of the information turns out to be inaccurate and the services are performed other than as promised.

2. The method of claim 1, further comprising:
   assessing the bondability of the information and services.
3. The method of claim 2, wherein the evaluating includes:
   determining the accuracy of the information when the bondability assessment concludes that the information is bondable, and
   determining whether the performance of the services is assured when the bondability assessment concludes that the services are bondable.
4. The method of claim 1, further comprising:
   receiving a warranty from the server, the warranty guaranteeing at least one of the accuracy of the information and the performance of the services by the server.
5. The method of claim 4, wherein the evaluating includes:
   determining that the information is accurate based on the warranty when the warranty guarantees the accuracy of the information, and
   determining that the performance of services is assured based on the warranty when the warranty guarantees the performance of the services.
6. The method of claim 1, wherein the evaluating includes:
   determining at least one of whether the information is accurate and whether the performance of services is assured.
7. The method of claim 6, wherein the determining includes:
   determining whether the information is accurate using one of statistical assessment, heuristic assessment, artificial intelligence, and online analytical processing.
8. The method of claim 6, wherein the determining includes:
   determining whether the performance of services is assured by analyzing one of past performance data, test run data, and systems in place by the server to perform the services.
9. The method of claim 1, wherein the evaluating includes:
   analyzing validity of the information.
10. The method of claim 9, wherein the assigning includes:
    assigning a bond to the information when the information is determined to be accurate and valid.
11. The method of claim 1, wherein the assigning includes:
    identifying an amount of indemnity to associate with the information or services, and
    associating the identified amount of indemnity with the information or services.
12. The method of claim 1, wherein the information includes a group of data and the performance of services includes a series of services; and
    wherein the receiving includes:
    receiving a request from the server to bond at least one of the group of data and the series of services provided by the server.
13. The method of claim 12, wherein the assigning includes:
    assigning a bond to the group of data or the series of services.

14. The method of claim 1, wherein the information includes information regarding one or more goods.

15. The method of claim 14, wherein the bond assures that the one or more goods are what the server represents the one or more goods to be.

16. The method of claim 1, wherein the services include delivery of one or more goods.

17. The method of claim 16, wherein the bond assures that the one or more goods are delivered as promised by the server.

18. A system for assigning a bond to at least one of information and services offered by a server in a transaction with a client, the bond assuring at least one of validity of the information and performance of the services provided by the server, comprising:

means for receiving a request from the server to assign a bond to at least one of the information and the services provided by the server;

means for evaluating at least one of the validity of the information and the performance of the services; and means for assigning a bond to at least one of the information when the information is determined to be valid and the services when performance of the services is assured, the bond assuring an indemnity will be provided to the client when at least one of the information is found to be invalid and the services are performed other than as offered.

19. A system for assigning a bond to at least one of information and services offered by a server in a transaction with a client, comprising:

a memory configured to store instructions; and a processor configured to execute the instructions in the memory to:

evaluate at least one of the information and the services offered by the server in response to a request from the server to assign a bond to the information or services offered by the server, and assign a bond to at least one of the information when the information is determined to be accurate and the services when performance of the services is assured, the bond assuring an indemnity will be provided to the client when at least one of the information is found to be inaccurate and the services are performed other than as assured.

20. The system of claim 19, wherein the processor is further configured to assess the bondability of the information and services.

21. The system of claim 20, where in the processor is configured to determine the accuracy of the information when the bondability assessment concludes that the information is bondable and determine whether the performance of the services is assured when the bondability assessment concludes that the services are bondable.

22. The system of claim 19, wherein the processor is further configured to receive a warranty from the server, the warranty guaranteeing at least one of the accuracy of the information and the performance of the services offered by the server.

23. The system of claim 22, wherein the processor is configured to determine that the information is accurate based on the warranty when the warranty guarantees the accuracy of the information, and determine that the performance of services is assured based on the warranty when the warranty guarantees the performance of the services.

24. The system of claim 19, wherein the processor is configured to determine at least one of whether the information is accurate and whether the performance of services is assured.

25. The system of claim 24, wherein the processor is configured to determine whether the information is accurate using one of statistical assessment, heuristic assessment, artificial intelligence, and online analytical processing.

26. The system of claim 24, wherein the processor is configured to determine whether the performance of services is assured by analyzing one of past performance data, test run data, and systems in place to perform the services.

27. The system of claim 19, wherein the processor is further configured to analyze validity of the information.

28. The system of claim 24, wherein the processor is configured to assign a bond to the information when the information is determined to be accurate and valid.

29. The system of claim 19, wherein the processor is configured to identify an amount of indemnity to associate with the information or services and associate the identified amount of indemnity with the information or services.

30. The system of claim 19, wherein the information includes a group of data and the performance of services includes a series of services; and wherein the processor is further configured to receive a request from the server to assign a bond to at least one of the group of data and the series of services provided by the server over a period of time.

31. The system of claim 30, wherein the processor is configured to assign a bond to the group of data or the series of services.

32. A method for assuring at least one of accuracy of information and performance of services provided to a client by a server in a transaction over a network, the method, performed by the server, comprising:

transmitting a request to a bonding entity to assign a bond to at least one of the information and the services offered by the server, the bonding entity being configured to:

assign a bond to at least one of the information and the services offered by the server, the bond assuring an indemnity will be provided to the client when at least one of the information is discovered to be inaccurate or invalid and the services are performed other than as assured;

receiving notification from the bonding entity that a bond has been assigned to at least one of the information and the services;

receiving initiation of a transaction from the client, the transaction including a request for at least one of the information and the services offered by the server; and providing the requested at least one of information and services to the client under bond.

33. The method of claim 32, wherein the information includes information regarding one or more goods.

34. The method of claim 33, wherein the bond assures that the one or more goods are what the server represents the one or more goods to be.

35. The method of claim 32, wherein the services include delivery of one or more goods.

36. The method of claim 35, wherein the bond assures that the one or more goods are delivered as assured by the server.

37. An automated method for assigning a bond to at least one of information and services provided by a server in a transaction with a client, the bond assuring at least one of accuracy of the information and performance of the services provided by the server, the method comprising:

receiving a request from the server to assign a bond to at least one of the information and the services provided by the server;

receiving a warranty from the server, the warranty indicating that the information is accurate or that the service performance is guaranteed; and assigning a bond to at least one of the information based on the warranty when the warranty indicates that the information is accurate and the services based on the warranty when the warranty indicates that the service performance is guaranteed, the bond assuring that an indemnity will be provided to the client when at least one of the information is discovered to be inaccurate and the services are performed other than as promised.

38. The method of claim 37, further comprising:

assessing the bondability of the information and services.

39. The method of claim 38, wherein the assigning includes:

associating a bond with the information when the bondability assessment concludes that the information is bondable, and associating a bond with the service performance when the bondability assessment concludes that the services are bondable.

40. The method of claim 37, wherein the warranty further indicates that the information is valid; and wherein the assigning includes:
assigning a bond to the information when the warranty indicates that the information is accurate and valid.

41. The method of claim 37, wherein the assigning includes:

identifying an amount of indemnity to associate with the information or services, and associating the identified amount of indemnity with the information or services.

42. The method of claim 37, wherein the information includes a group of data and the performance of services includes a series of services; and wherein the receiving a warranty includes:
receiving a warranty indicating at least one of that the group of data is accurate and that performance of the series of services is guaranteed.

43. The method of claim 42, wherein the assigning includes:

assigning a bond to the group of data or the series of services.

44. The method of claim 37, wherein the information includes information regarding one or more goods.

45. The method of claim 44, wherein the bond assures that the one or more goods are what the server represents the one or more goods to be.

46. The method of claim 37, wherein the services include delivery of one or more goods.

47. The method of claim 46, wherein the bond assures that the one or more goods are delivered as promised by the server.

48. A system for assigning a bond to at least one of information and services offered by a server in a transaction with a client, comprising:

a memory configured to store instructions; and
a processor connected to the memory and configured to:
receive a request from the server to assign a bond to at least one of the information and the services offered by the server, receive a warranty from the server, the warranty indicating that the information is accurate or that performance of the services is guaranteed, and assign a bond to at least one of the information based on the warranty when the warranty indicates that the information is accurate and the services based on the warranty when the warranty indicates that performance of the services is guaranteed, the bond assuring an indemnity will be provided to the client when at least one of the information is found to be inaccurate and the services are performed other than as guaranteed.

49. The system of claim 48, wherein the processor is further configured to assess the bondability of the information and services.

50. The system of claim 49, wherein the processor is configured to assign a bond to the information when the bondability assessment concludes that the information is bondable, and assign a bond to the services when the bondability assessment concludes that the services are bondable.

51. The system of claim 48, wherein the warranty further indicates that the information is valid; and wherein the processor is configured to assign a bond to the information when the warranty indicates that the information is accurate and valid.

52. The system of claim 48, wherein the processor is configured to identify an amount of indemnity to associate with the information or services, and associate the identified amount of indemnity with the information or services.

53. The system of claim 48, wherein the information includes a group of data and the services include a series of services; and wherein the processor is configured to receive a warranty indicating at least one of that the group of data is accurate and that the series of services is guaranteed.

54. The system of claim 53, wherein the processor is configured to assign a bond to the group of data or the series of services.

55. A method for assuring at least one of accuracy of information and performance of services provided to a client by a server in a transaction over a network, the method, performed by the server, comprising:

transmitting a request to a bonding entity to assign a bond to at least one of the information and the services offered by the server;

transmitting a warranty from the server, the warranty indicating to the bonding entity that the information is accurate and valid or that performance of the services is guaranteed, the bonding entity being configured to assign a bond to at least one of the information based on the warranty when the warranty indicates that the information is accurate and valid and the services based on the warranty when the warranty indicates that the performance of the services is guaranteed, the bond assuring an indemnity will be provided when at least one of the information is discovered to be inaccurate or invalid and the services are performed other than as guaranteed;

receiving notification from the bonding entity that a bond has been assigned to at least one of the information and the services;

receiving initiation of a transaction from the client, the transaction including a request for at least one of the information and the services offered by the server; and providing the requested at least one of information and services to the client under bond.

56. The method of claim 55, wherein the information includes information regarding one or more goods.

57. The method of claim 56, wherein the bond assures that the one or more goods are what the server represents the one or more goods to be.

58. The method of claim 55, wherein the services include delivery of one or more goods.

59. The method of claim 58, wherein the bond assures that the one or more goods are delivered as guaranteed by the server.

60. An automated method for assigning a bond to at least one of a group of data and a series of services provided by a server to one or more clients, the bond guaranteeing at least one of accuracy of the group of data and performance of the series of services provided by the server over a period of time, the method comprising:

receiving a request from the server to assign a bond to at least one of the group of data and the series of services provided by the server over the time period;

analyzing at least one of the accuracy of the group of data and performance of the series of services; and assigning a bond to at least one of the group of data when the data is determined to be accurate and the series of services when performance of the series of services is assured, the bond assuring an indemnity will be provided to the one or more clients when at least one of the group of data is found to be inaccurate and the series of services are performed other than as assured.

61. The method of claim 60, further comprising:

receiving a warranty from the server, the warranty guaranteeing at least one of the accuracy of the group of data and performance of the series of services.

62. The method of claim 61, wherein the analyzing includes:

determining that the group of data is accurate based on the warranty when the warranty guarantees the accuracy of the group of data, and determining that the performance of the series of services is assured based on the warranty when the warranty guarantees the performance of the series of services.

63. The method of claim 60, wherein the analyzing includes:

determining at least one of whether the group of data is accurate and whether the performance of the series of services is assured.

64. The method of claim 63, wherein the determining includes:

determining whether the group of data is accurate using one of statistical assessment, heuristic assessment, artificial intelligence, and online analytical processing.

65. The method of claim 63, wherein the determining includes:

determining whether the performance of the series of services is assured by analyzing one of past performance data, test run data, and systems in place by the server to perform the series of services.

66. The method of claim 60, wherein the analyzing includes:

determining validity of the group of data.

67. The method of claim 66, wherein the assigning includes:

assigning a bond to the group of data when the group of data is determined to be accurate and valid.

68. The method of claim 60, wherein the assigning includes:

identifying an amount of indemnity to associate with the group of data or series of services, and associating the identified amount of indemnity with the group of data or the series of services.

69. The method of claim 60, wherein the group of data includes information regarding one or more goods.

70. The method of claim 60, wherein the series of services includes delivery of one or more goods.

71. A system for assigning a bond to at least one of a group of data and a series of services provided to one or more clients by a server over a period of time, comprising:

a memory configured to store a plurality of instructions; and a processor configured to execute the instruction in the memory to:

evaluate at least one of the group of data and the series of services in response to a request from the server to assign a bond to at least one of the group of data and the series of services provided by the server over the time period, and assign a bond to at least one of the group of data when the data is determined to be accurate and the series of services when performances of the series of services is assured, the bond assuring an indemnity will be provided to the one or more clients when at least one of the group of data is found to be inaccurate and the series of services are performed other than as assured.

72. The system of claim 71, wherein the processor is further configured to receive a warranty from the server, the warranty guaranteeing at least one of the accuracy of the group of data and performance of the series of services provided by the server.

73. The system of claim 72, wherein the processor is configured to determine that the group of data is accurate based on the warranty when the warranty guarantees the accuracy of the group of data, and determine that the performance of the series of services is assured based on the warranty when the warranty guarantees the performance of the series of services.

74. The system of claim 71, wherein the processor is configured to determine at least one of whether the group of data is accurate and whether the performance of the series of services is assured.

75. The system of claim 74, wherein the processor is configured to determine whether the group of data is accurate using one of statistical assessment, heuristic assessment, artificial intelligence, and online analytical processing.

76. The system of claim 74, wherein the processor is configured to determine whether the performance of the series of services is assured by analyzing one of past performance data, test run data, and systems in place by the server to perform the series of services.

77. The system of claim 71, wherein the processor is further configured to analyze validity of the group of data.

78. The system of claim 77, wherein the processor is configured to assign a bond to the group of data when the group of data is determined to be accurate and valid.

79. The system of claim 71, wherein the processor is configured to identify an amount of indemnity to associate with the group of data or series of services, and associate the identified amount of indemnity with the group of data or the series of services.

80. A method for assuring at least one of accuracy of a group of data and performance of a series of services provided to one or more clients by a server over a period of time, the method, performed by the server, comprising:

transmitting a request to a bonding entity to assign a bond to the group of data or the series of services provided by the server over the time period, the bonding entity being configured to assign a bond to at least one of the group of data and the series of services provided by the server, the bond assuring an indemnity will be provided to the one or more clients when at least one of the group of data is found to be inaccurate and the series of services is performed other than as promised;

receiving notification from the bonding entity that a bond has been assigned to at least one of the group of data and the series of services;

receiving initiation of one or more transactions from the one or more clients, the one or more transactions including a request for at least one of the group of data and the series of services offered by the server; and providing the requested at least one of the group of data and the series of services to the one or more clients under bond.

81. The method of claim 80, wherein the group of data includes one or more goods.

82. The method of claim 80, wherein the series of services includes delivery of one or more goods.

83. A method for assigning a bond to information provided by a server to a client over a network, the bond guaranteeing accuracy or validity of the information provided by the server, the method comprising:

analyzing a request from the server to assign a bond to the information provided by the server;

determining whether the information is accurate or valid; and assigning a bond to the information when the information is determined to be accurate or valid, the bond identifying an amount of indemnity to be paid to the client when the information is found to be inaccurate or invalid.

84. The method of claim 83, wherein the determining includes:

receiving a warranty from the server, the warranty guaranteeing that the information is accurate or valid.

85. The method of claim 83, wherein the information includes data regarding one or more goods.

86. A method for assigning a bond to a service offered by a server to a client, the bond guaranteeing performance of the service offered by the server, the method comprising:

analyzing a request from the server to assign a bond to performance of the service offered by the server;

determining whether performance of the service is assured; and assigning a bond to the performance of the service when the performance of the service is determined to be assured, the bond identifying an amount of indemnity to be paid to the client when the service is performed in a manner other than as offered.

87. The method of claim 86, wherein the determining includes:

receiving a warranty from the server, the warranty guaranteeing that the service will be performed as offered.

88. The method of claim 86, wherein the service includes delivery of one or more goods.

* * * * *